United States Patent
Burgess et al.

(10) Patent No.: US 10,435,004 B2
(45) Date of Patent: Oct. 8, 2019

(54) ABDW TO ABDX-R CONTROL VALVE CONVERSION

(71) Applicant: WABTEC HOLDING CORP., Wilmerding, PA (US)

(72) Inventors: Larren A. Burgess, Monroeville, PA (US); Edward W. Gaughan, Greensburg, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/402,318

(22) PCT Filed: May 29, 2013

(86) PCT No.: PCT/US2013/042990
§ 371 (c)(1),
(2) Date: Nov. 20, 2014

(87) PCT Pub. No.: WO2013/181189
PCT Pub. Date: Dec. 5, 2013

(65) Prior Publication Data
US 2016/0096517 A1    Apr. 7, 2016

Related U.S. Application Data

(60) Provisional application No. 61/653,791, filed on May 31, 2012.

(51) Int. Cl.
*B60T 15/00* (2006.01)
*B60T 15/02* (2006.01)
(Continued)

(52) U.S. Cl.
CPC .......... *B60T 15/021* (2013.01); *B60T 13/665* (2013.01); *B60T 15/02* (2013.01); *B60T 17/228* (2013.01); *F16K 3/0254* (2013.01); *F16K 3/0272* (2013.01)

(58) Field of Classification Search
CPC ...... B60T 13/665; B60T 15/42; B60T 15/048; B60T 15/184; B60T 15/021
See application file for complete search history.

(56) References Cited

U.S. PATENT DOCUMENTS 802,913 A * 10/1905 Chapsal et al. ....... B60T 15/048
303/1
912,716 A *  2/1909 Murphy ................ B60T 15/048
303/60
(Continued)

OTHER PUBLICATIONS

Wabco, Shop Maintenance 2391, S.3. Wabtec Company, Mar. 2007.

*Primary Examiner* — Bradley T King
*Assistant Examiner* — Stephen M Bowes
(74) *Attorney, Agent, or Firm* — The Webb Law Firm

(57) ABSTRACT

A system for converting an ABDW-type control valve to an ABDX-type control valve for use in a braking mechanism for a railway vehicle includes an ABDW-type control valve body in communication with an air supply system of the braking mechanism for controlling an application and release of brakes in response to changes in air pressure within the braking mechanism. A breather plate is mounted on an accelerated application valve interface on the control valve body. The breather plate has an internal stability volume for compensating a function of an accelerated application valve. A modified slide valve bushing is mounted inside the control valve body for establishing fluid communication with at least one passageway within the control valve body. At least one plug mounted is to at least one air passageway within the control valve body for sealing or choking the at least one air passageway.

19 Claims, 15 Drawing Sheets

(51) Int. Cl.
*B60T 13/66* (2006.01)
*B60T 17/22* (2006.01)
*F16K 3/02* (2006.01)

(56) References Cited

U.S. PATENT DOCUMENTS

| | | | | |
|---|---|---|---|---|
| 2,230,701 A | * | 2/1941 | Searle | B60T 15/048 |
| | | | | 303/54 |
| 3,988,044 A | * | 10/1976 | Hill | B60T 15/42 |
| | | | | 303/38 |
| 4,768,556 A | * | 9/1988 | Rees | B60T 15/18 |
| | | | | 137/627.5 |
| 4,798,420 A | | 1/1989 | Rojecki | |
| 5,071,198 A | | 12/1991 | Troiani | |
| 5,118,166 A | | 6/1992 | Panebianco | |
| 5,333,941 A | * | 8/1994 | Hart | B60T 15/42 |
| | | | | 303/40 |
| 5,676,431 A | * | 10/1997 | McLaughlin | B60T 13/665 |
| | | | | 303/15 |
| 6,318,812 B1 | | 11/2001 | Newton et al. | |
| 2009/0218880 A1 | * | 9/2009 | Thomas | B60T 15/021 |
| | | | | 303/82 |

* cited by examiner

ABDW TO ABDX-R CONTROL VALVE CONVERSION

CROSS REFERENCE TO RELATED APPLICATIONS

This application is the United States national phase of International Application No. PCT/US2013/042990 filed May 29, 2013, and claims priority to U.S. Provisional Patent Application No. 61/653,791, filed on May 31, 2012, the disclosures of which are hereby incorporated in their entirety by reference.

BACKGROUND OF THE INVENTION

Field of the Invention

The present disclosure relates generally to railway vehicle brake equipment. More particularly, the present disclosure relates to an apparatus and method for converting an ABDW control valve to an ABDX-R control valve for use in railway vehicle brake equipment.

Description of the Related Art

Railway vehicle braking systems generally operate by charging and discharging compressed air to and from one or more storage reservoirs located on each railway car. Each storage reservoir is connected to a compressed air source, such as a locomotive air compressor, by a brake pipe. The storage reservoirs are typically separated from the brake pipe by a brake valve which is sensitive to changes in air pressure in the brake pipe. The brake valve senses a pressure drop in the brake pipe and utilizes the compressed air from one or more storage reservoirs to apply the brakes. Because brakes are applied by discharging the air pressure from the storage reservoirs, modern railway vehicle braking systems have a built-in safety feature. In case of a significant air loss, such as during unwanted separation of railway vehicles or a sudden failure of the compressed air source, the brake valve will initiate a full-force, emergency brake application by discharging the compressed air stored in the storage reservoirs.

Railway vehicle braking systems are typically controlled by an operator using a control stand in the locomotive. As the brake valve is moved to release the compressed air in the brake pipe, the loss in air pressure is sensed by individual brake valves on each railway vehicle. Using the air pressure from the one or more storage reservoirs on the railway vehicle, the brake valve applies force on a brake piston to apply the brakes on the railway vehicle. In order to release the brakes, the air pressure in the brake pipe must be restored to cause the brake valve to exhaust the pressure in the brake piston and thereby release the brakes. The system then recharges the air in the storage reservoirs and maintains the air pressure in the brake pipe until the subsequent brake application.

Over the years, a number of railway vehicle braking systems have evolved, the AB-based braking system being the most common. In the AB-based braking system, slight brake pipe pressure reductions do not cause unintended service or emergency brake applications and there is less sensitivity to brake pipe leakage compared to previous braking systems. AB-based control valves receive air from the brake pipe through a cross-over pipe and direct the air to various reservoirs on the railway vehicle during the recharging of the braking system. A plurality of different AB-based control valves have been developed throughout the years.

In one embodiment, an ABD-type control valve includes a pipe bracket and two primary operating portions. Pipe connections from the brake pipe are made to the valve body, which is secured to the frame of a railway vehicle. The two primary operating portions include an emergency portion and a service operating portion. ABD-type control valves include an accelerated release function, where a rapid rise in brake pipe pressure on a first railway vehicle causes a chain reaction on the rest of the vehicles throughout the train and a much quicker release of the brakes.

An improvement to the ABD-type control valve was introduced in 1974 in the form of an ABDW control valve. Its main advancements over ABD-type control valves are a faster brake application and continuous action though an accelerated application valve. The ABDW control valve exhausts air from the brake pipe locally at each car using the accelerated application valve as long as air is being exhausted at the automatic brake valve in the control stand of the locomotive. This causes an accelerated buildup of brake cylinder pressure during service brake applications. During a brake release, the ABDW valve functions in a similar manner to an ABD valve. These control valves are approved for railway vehicles of up to 75 feet in length. Railway vehicles equipped with an ABDW control valve that exceed the 75-foot length must be equipped with additional or supplemental devices to provide an increase in accelerated application valve activity.

The latest improvement to AB-type control valves occurred in 1994 with the introduction of an ABDX control valve. The ABDX control valves are designed for operation on conventional trains and modern freight trains that are longer, heavier, and operate at higher speeds. Whereas ABDW control valves rely on an external accelerated application valve to effect a local exhaustion of air from the brake pipe, ABDX valves have a built-in capability that eliminates the need for an external accelerated application valve. The ABDX control valves provide an improved, more efficient accelerated application valve function, as well as increased stability against undesired emergency applications resulting from fluctuations in brake pipe pressure.

Considering that a plurality of AB-type control valves have been developed throughout the years, railway vehicles traveling on today's railways may be equipped with any of the above-described control valves. While most new railway vehicles are built with the most modern ABDX-type control valves, many existing railway vehicles utilize older, less-effective AB-type control valves, such as an ABDW-type valve. In order to update the braking system of an older railway car to the newest control valve, it is necessary to completely replace an existing ABDW control valve with a new ABDX control valve. The upgrade from an ABDW-type control valve to an ABDX-type control valve provides an improved accelerated application valve and the stability functionality of the ABDX-type control valve.

SUMMARY OF THE INVENTION

In view of the foregoing, a need exists in the art to convert an existing ABDW-type control valve to have the function of an ABDX-type control valve without replacing the existing control valve. An additional need exists for an apparatus and method for converting the ABDW-type control valve to have the service stability, application speed, and other operating parameters of an ABDX-type control valve.

Accordingly, a system for converting an ABDW-type control valve to an ABDX-type control valve for use in a braking mechanism for a railway vehicle is needed. In accordance with one embodiment, the system may include an ABDW-type control valve body in communication with an air supply system of the braking mechanism for the railway vehicle. The control valve body is desirably operative for controlling an application and release of brakes in response to changes in air pressure within the braking mechanism for the railway vehicle. The system may further include a breather plate provided on an accelerated application valve interface on the control valve body. The breather plate may have an internal stability volume for compensating a function of an accelerated application valve. A slide valve bushing may be provided inside the control valve body for establishing fluid communication with at least one passageway within the control valve body. Additionally, at least one plug may be provided for sealing at least one air passageway within the control valve body.

In accordance with another embodiment, the breather plate may further include a body having a first side opposite a second side and an internal stability volume between the first side and the second side. The breather plate may additionally include a first opening and a second opening in communication with the internal stability volume and in alignment with a first passageway and a second passageway on the accelerated application valve interface of the control valve body. A gasket surrounding the first opening and the second opening may be provided for sealing the fluid connection between the first passageway on the control valve body and the first opening on the breather plate and the second passageway on the control valve body and the second opening on the breather plate. A plurality of through holes in alignment with a plurality of bolt holes on the accelerated application valve interface of the ABDW-type control valve body may be provided for connecting the breather plate to the control valve body.

In accordance with yet another embodiment, the breather plate may further include a breather plate plug connected to the body and in communication with the internal stability volume. In one embodiment, the breather plate plug may extend within the internal stability volume. Additionally, the breather plate plug may include an O-ring seal. In another embodiment, the breather plate may further include a recessed gasket face on the first side of the breather plate. The gasket may be recessed within the recessed gasket face. A choke plug may be provided in one of the first opening or the second opening. The choke plug may have a central passage extending through a longitudinal length thereof. The breather plate may further include a drive stud provided on the first side for engaging a corresponding opening provided on the control valve body.

In a further embodiment, the slide valve bushing may include a plurality of recessed passageways extending around at least a part of an external perimeter of the bushing. The plurality of recessed passageways is desirably separated axially along a longitudinal extent of the bushing. Additionally, the slide valve bushing may include a plurality of through passages extending radially through at least one side of the bushing, wherein the plurality of through passages may be separated axially along a longitudinal extent of the bushing. In one embodiment, one of the plurality of plugs may be an accelerated application valve choke plug provided in an accelerated application valve choke on the valve body. The accelerated application valve choke plug may include a mesh filter to filter impurities in air passing through the accelerated application valve choke. In another embodiment, the accelerated application valve choke plug may be inserted into an accelerated application valve bushing that is pressed inside the accelerated application valve opening. In a further embodiment, a slot may be provided between accelerated application valve opening and an air chamber to establish a fluid connection between the accelerated application valve opening and the air chamber.

In another embodiment, a breather plate for connecting and mounting to an accelerated application valve interface of an ABDW-type control valve body for converting an ABDW-type control valve to an ABDX-type control valve may include a body having a first side opposite a second side and an internal stability volume between the first side and the second side.

The breather plate may additionally include a first opening and a second opening in communication with the internal stability volume and in alignment with a first passageway and a second passageway on the accelerated application valve interface of the control valve body. A gasket surrounding the first opening and the second opening may be provided for sealing the fluid connection between the first passageway on the control valve body and the first opening on the breather plate and the second passageway on the control valve body and the second opening on the breather plate. A plurality of through holes in alignment with a plurality of bolt holes on the accelerated application valve interface of the ABDW-type control valve body may be provided for connecting the breather plate to the control valve body.

In accordance with yet another embodiment, the breather plate may further include a breather plate plug connected to the body and in communication with the internal stability volume. In one embodiment, the breather plate plug may be set within the internal stability volume. Additionally, the breather plate plug may include an O-ring seal. In another embodiment, the breather plate may further include a recessed gasket face on the first side of the breather plate. The gasket may be recessed within the recessed gasket face. A choke plug may be provided in one of the first opening or the second opening. The choke plug may have a central passage extending through a longitudinal length thereof. The breather plate may further include a drive stud provided on the first side for engaging a corresponding opening provided on the control valve body.

In yet another embodiment, a method for converting an ABDW-type control valve to an ABDX-type control valve for use in a braking mechanism for a railway vehicle may include the steps of removing an accelerated application valve from an ABDW-type control valve body to expose an accelerated application valve interface and mounting a breather plate on the accelerated application valve interface. The breather plate may have an internal stability volume for compensating the function of the accelerated application valve. The method may further include the steps of mounting a slide valve bushing inside the control valve body for establishing fluid communication with at least one passageway within the control valve body. In another embodiment, the method may include the step of mounting at least one plug for sealing at least one air passageway within the control valve body. In a further embodiment, the method may include the steps of expanding an accelerated application valve opening for pressing an accelerated valve bushing and providing a slot between the accelerated application valve opening and an air chamber on the valve body for establishing a fluid communication between the accelerated application valve opening and the air chamber.

These and other features and characteristics of the apparatus and method for ABDW to ABDX control valve conversion, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1A:
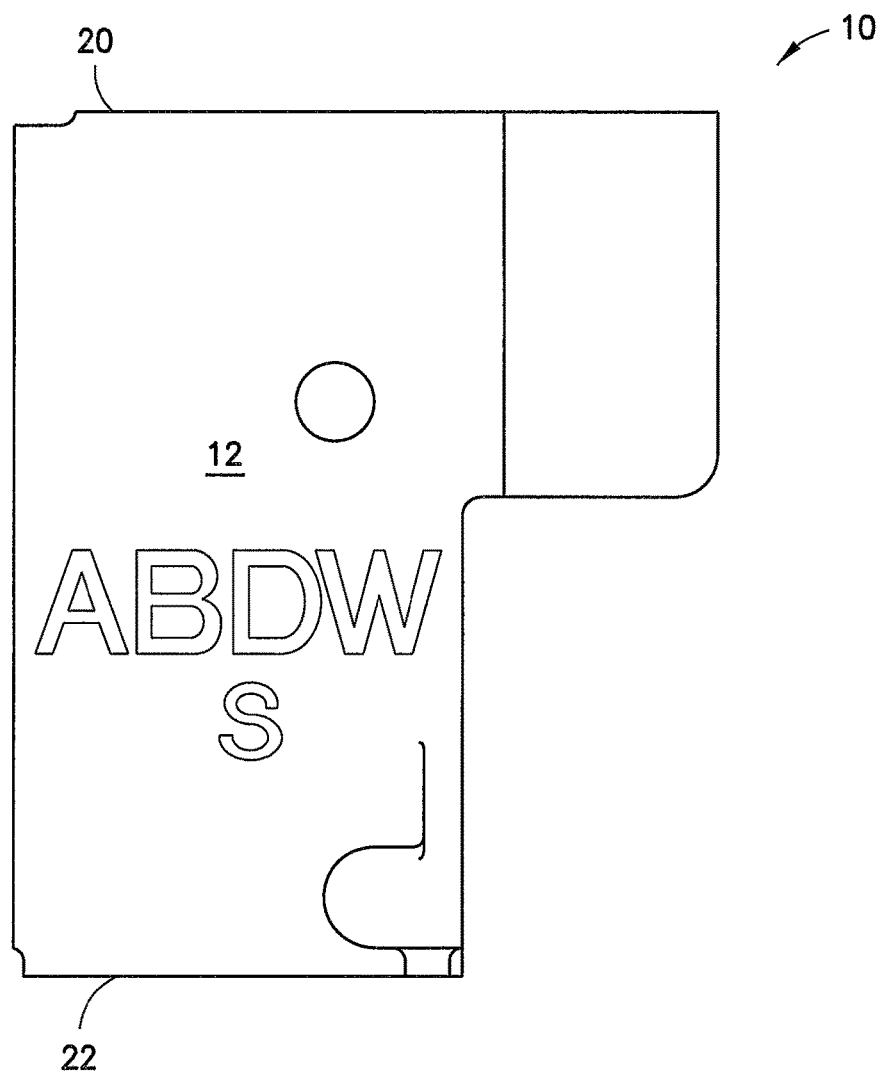
FIG. 1A is a front view of an ABDW control valve body modified in accordance with one embodiment of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1A-1E, a body of an emergency portion of an ABDW control valve 10 is illustrated (hereinafter referred to as "valve body"). Valve body 10 is shown separate from the pipe bracket and service portion, which are omitted for the clarity of the disclosure. One of ordinary skill in the art will understand that valve body 10 can be coupled to conventional pipe bracket and service portion in a complete control valve assembly. Valve body 10 includes a front side 12 opposite a rear side 14. A pair of opposing sides 16, 18 extends between front side 12 and rear side 14 to define an external contour of valve body 10. A top side 20 and bottom side 22 extend across upper and lower portions of valve body 10.

Figure 1B:
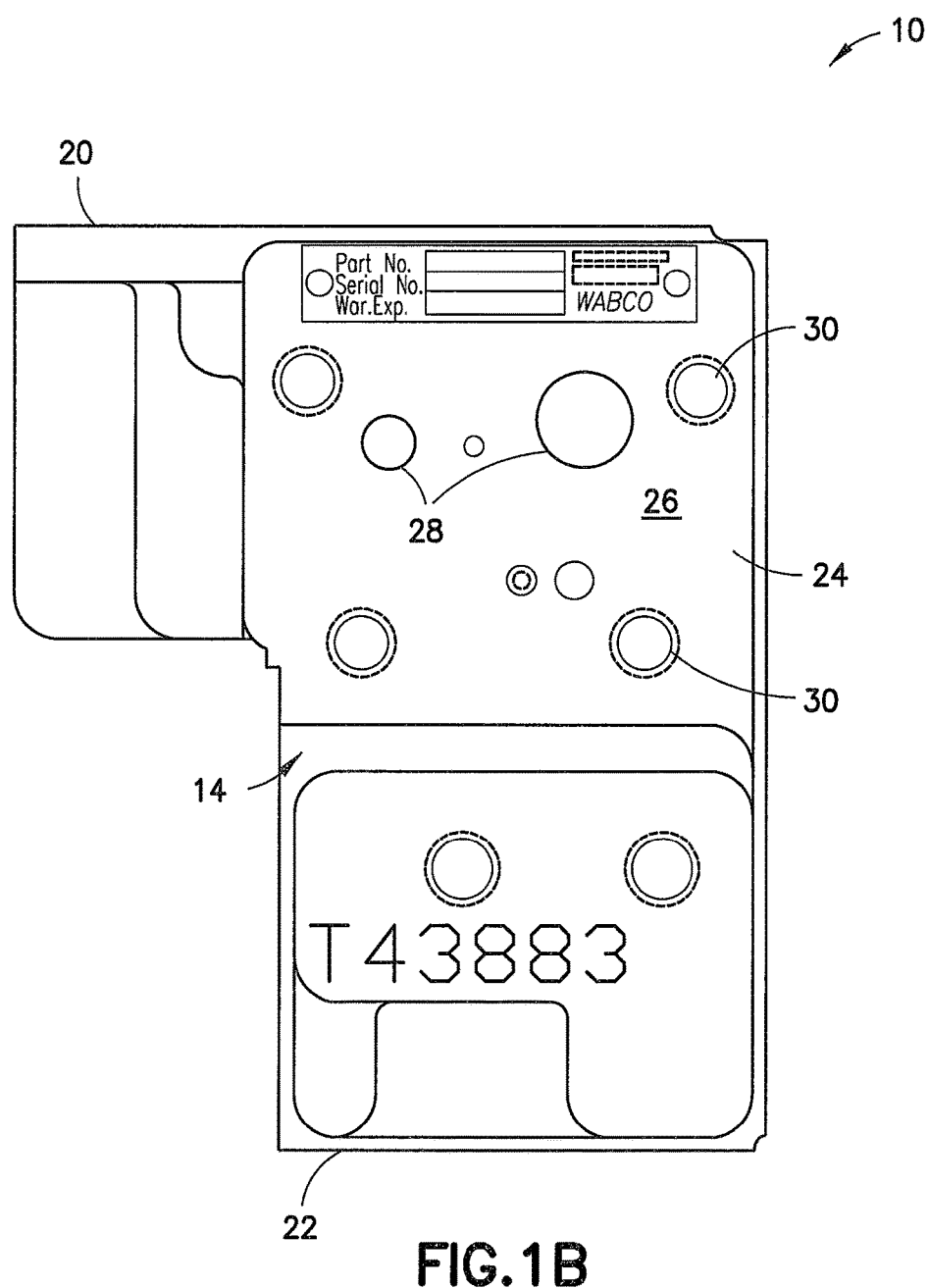
FIG. 1B is rear view of the ABDW control valve body shown in FIG. 1A.
Figure 1C:
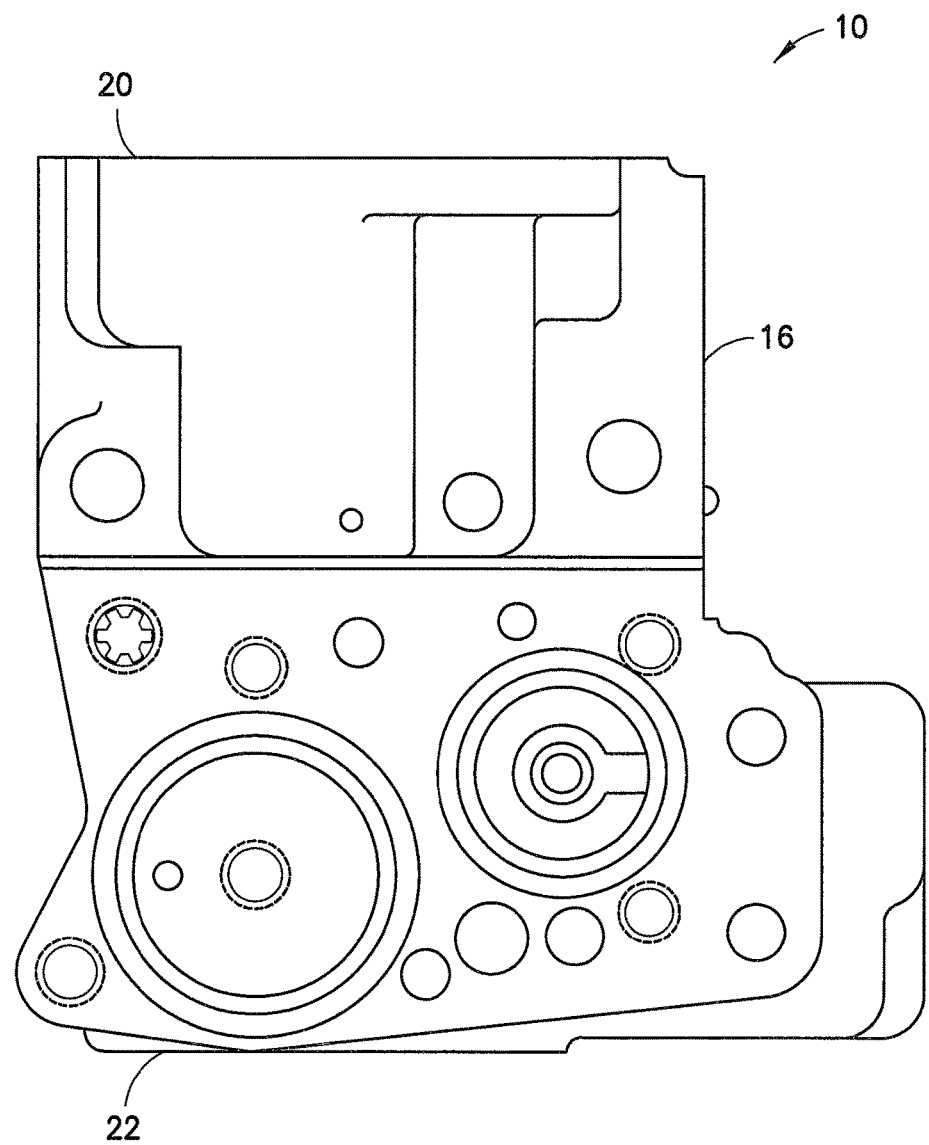
FIG. 1C is a left side view of the ABDW control valve body shown in FIG. 1A.

With particular reference to FIG. 1B, rear side 14 of valve body 10 includes an interface 24 for connecting an accelerated application valve (not shown). Interface 24 includes a substantially planar face 26 having a plurality of first air passages 28 for directing air to and from the accelerated application valve. A plurality of bolt holes 30 are disposed around the plurality of air passages 28 for connecting the accelerated application valve to valve body 10. Bolt holes 30 are adapted for engagement with conventional fasteners (not shown) to removably secure the accelerated application valve to valve body 10.

Figure 1D:
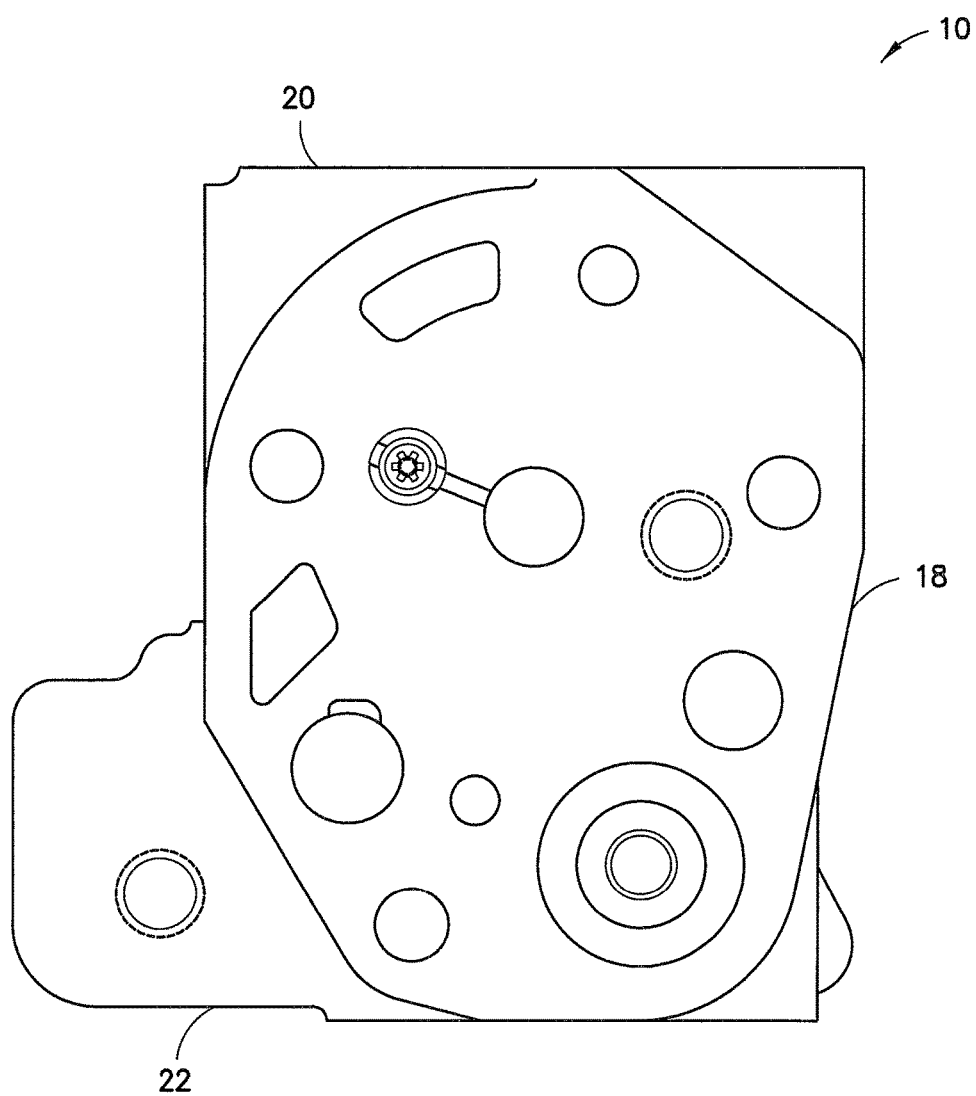
FIG. 1D is a right side view of the ABDW control valve body shown in FIG. 1A.
Figure 1E:
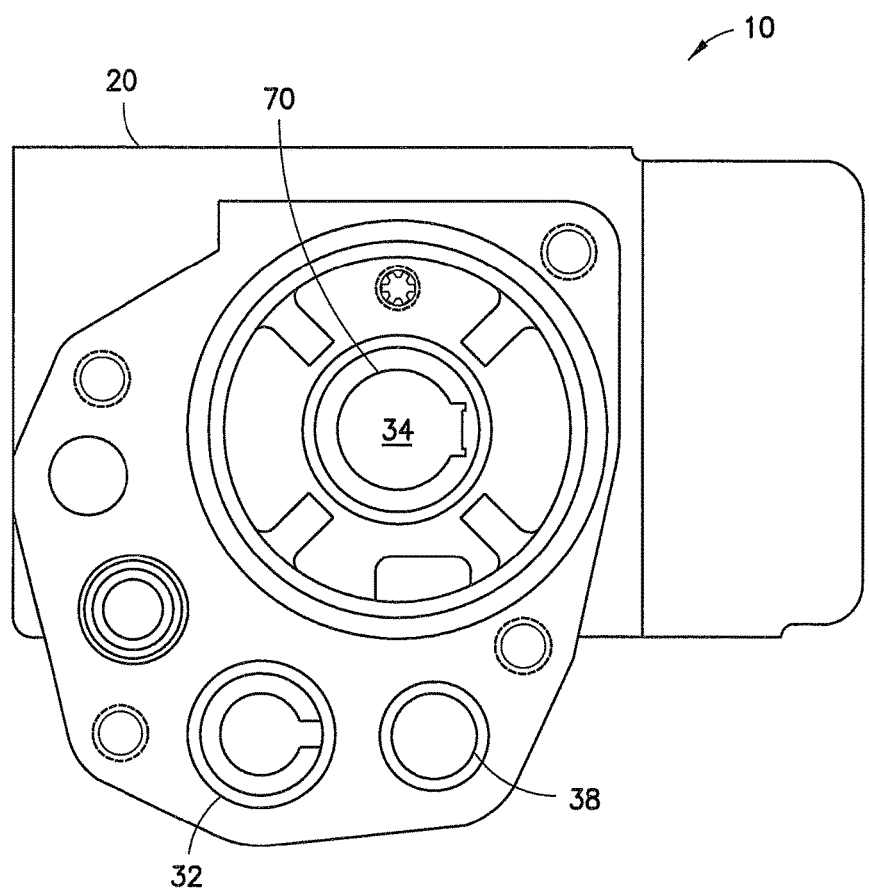
FIG. 1E is a top view of the ABDW control valve body shown in FIG. 1A.

Referring to FIG. 1E, a plurality of air connections 32 are provided on a top side 20 of valve body 10. A slide valve opening 34 is provided in a central portion of top side 20 and is adapted for engaging a slide valve (not shown). The slide valve engages the conforming seat in a slide valve bushing 70. The slide valve is housed within the slide valve opening and move axially with the emergency piston (not shown). As will be described hereafter, slide valve bushing 70 has a plurality of keyed passageways positionable for fluid communication with a corresponding plurality of air passageways within valve body 10. Depending on the orientation of the slide valve within slide valve bushing 70, fluid pressure communication between various passageways within valve body 10 can be established or interrupted. Quick action passageway chamber 38 is provided adjacent to slide valve opening 34 on top side 20 of valve body 10.

Figure 2:
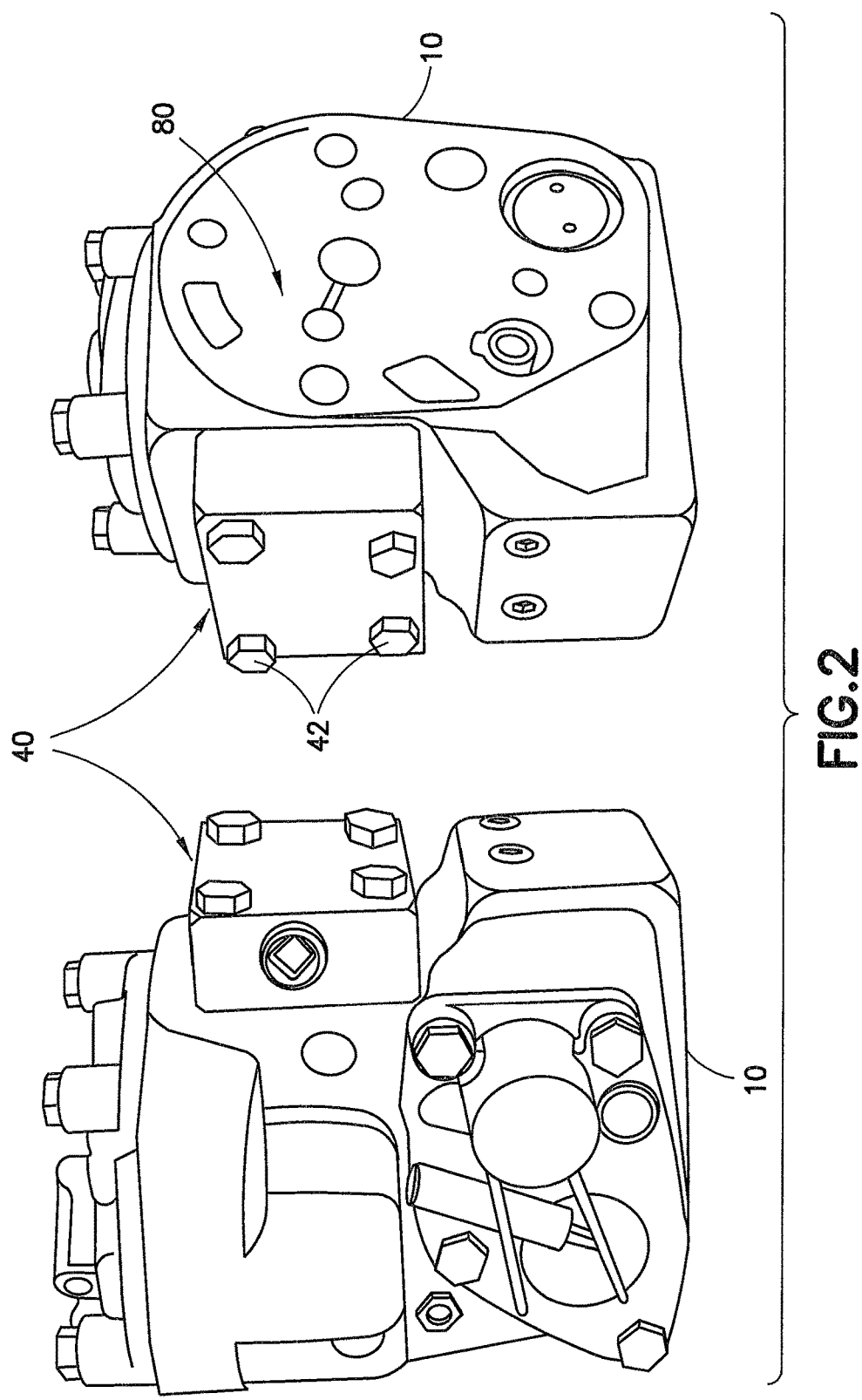
FIG. 2 is a perspective view of an ABDW control valve modified in accordance with one embodiment of the present disclosure.

In order to convert a function of an ABDW control valve to that of an ABDX control valve, several modifications and additions must be made to valve body 10. Because ABDX control valves have an internal compensation for the stability volume provided by the accelerated application valve, an ABDW valve body is modified to include a corresponding stability volume in place of an accelerated application valve. Removal of the accelerated application valve from an ABDW valve body requires the addition of a stability volume incorporating the quick action chamber breather choke. With reference to FIG. 2, an ABDW-type valve body 10 is shown with a breather plate 40 provided to compensate for the removal of an accelerated application valve. Breather plate 40 is connected to rear side 14 of valve body 10 by fastening breather plate 40 to planar face 26 using a plurality of fasteners 42 engaging bolt holes 30 (shown in FIG. 1B).

Figure 3A:
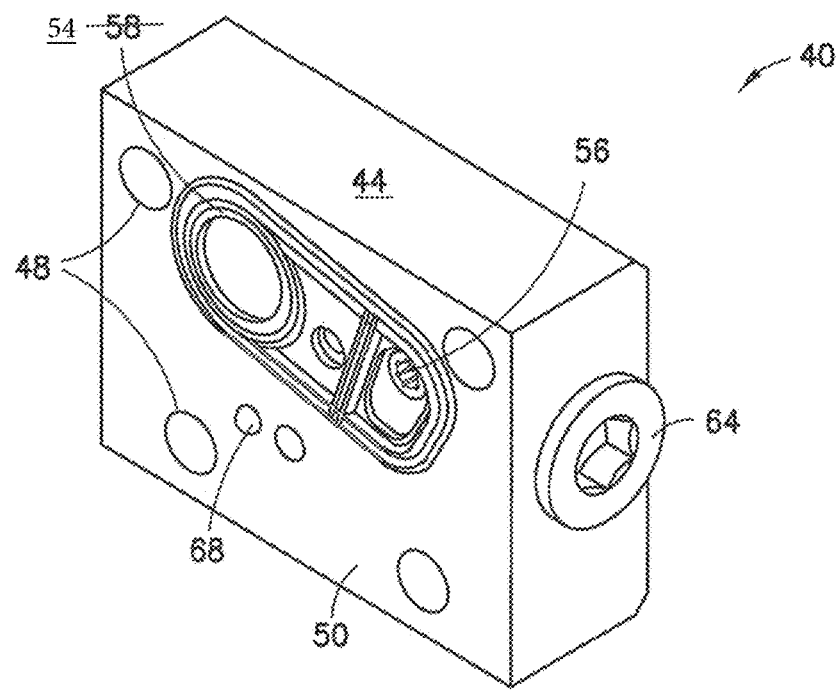
FIG. 3A is a perspective view of an assembled breather plate for use on an emergency portion of an ABDW control valve modified in accordance with one embodiment of the present disclosure.
Figure 3B:
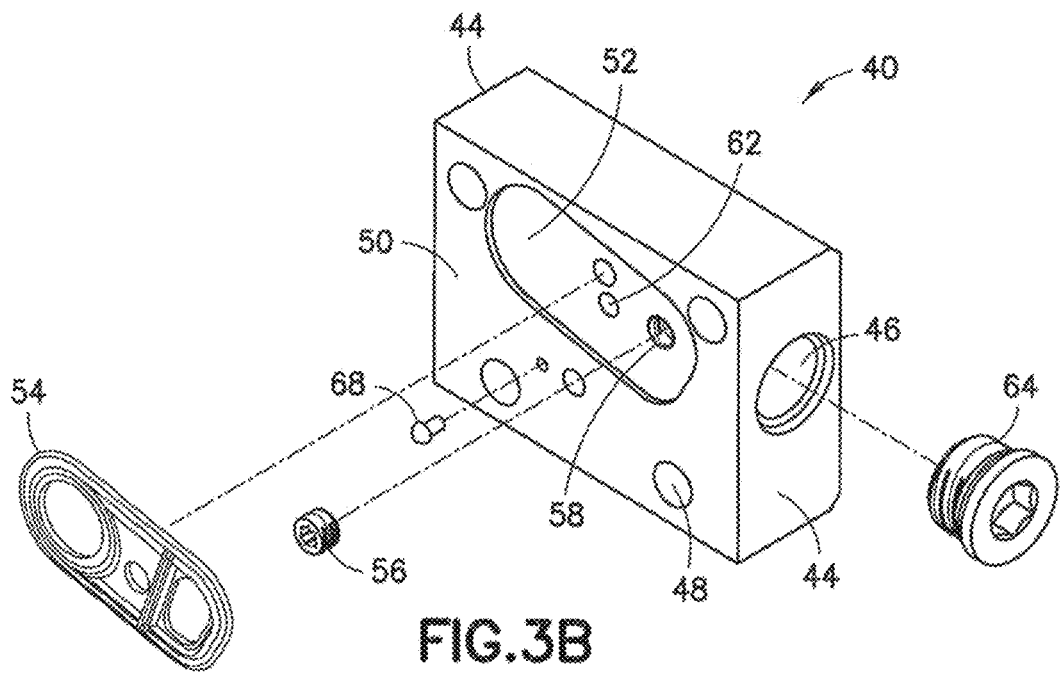
FIG. 3B is an exploded perspective view of the breather plate shown in FIG. 3A.

With reference to FIGS. 3A-3B, breather plate 40 has a generally block-shaped body 44 having an internal volume 46. Body 44 includes a plurality of through holes 48 corresponding to the plurality of bolt holes 30 on valve body 10 (shown in FIG. 1B). Each through hole 48 accepts a fastener 42 (shown in FIG. 2) to fasten breather plate 40 to valve body 10. A first side 50 of body 44 includes a recessed gasket face 52 adapted for retaining a gasket 54 therein. Gasket face 52 is dimensioned to encompass the plurality of first air passages 28 provided on rear side 14 of valve body 10 (see FIG. 1B). Gasket 54 provides a seal at the interface between first side 50 of breather plate 40 and planar face 26 of valve body 10. Gasket 54 is desirably seated within gasket face 52.

With continuing reference to FIGS. 3A-3B, a choke plug 56 is provided to reduce the area one of the plurality of first air passages 28. As shown in FIG. 3D, choke plug 56 may be threaded into a first opening 58 extending through the first side 50 of body 44. A central passage 60 extends through choke plug 56 to provide fluid communication between air passage 28 on valve body 10 and internal volume 46 of breather plate 40. In one embodiment, central passage 60 is bored to have a diameter corresponding to a diameter of a #46 drill (0.081 in). Choke plug 56 is in communication with the quick action chamber of valve body 10. A second opening 62 is provided adjacent to first opening 58 and provides a direct fluid communication with the second air passage 28 on valve body 10.

Figure 3C:
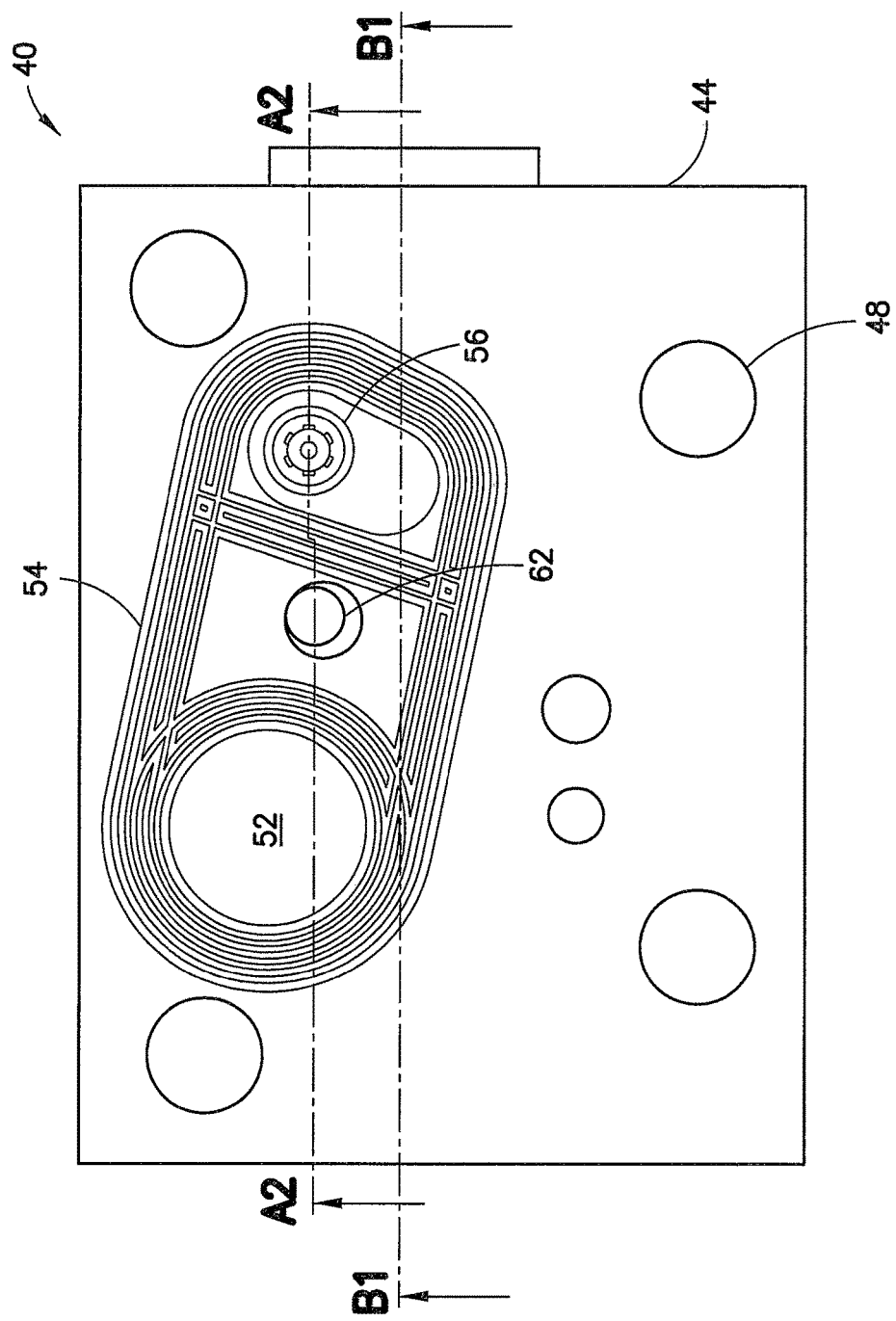
FIG. 3C is a front view of the breather plate shown in FIG. 3A.
Figure 3D:
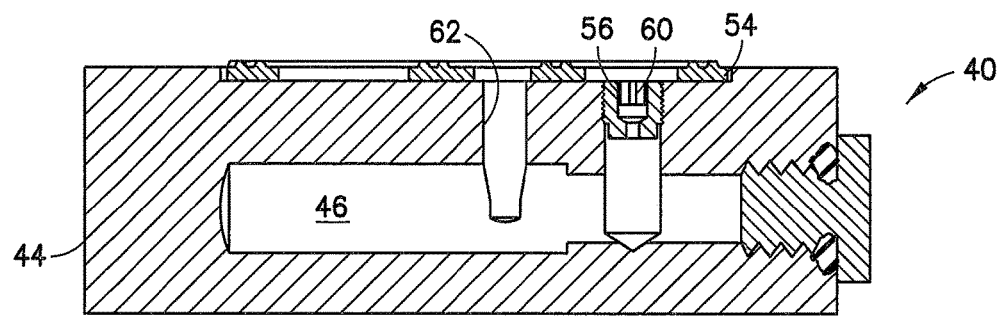
FIG. 3D is a cross-sectional view of the breather plate shown in FIG. 3C, taken along the line A1-A1.
Figure 3E:
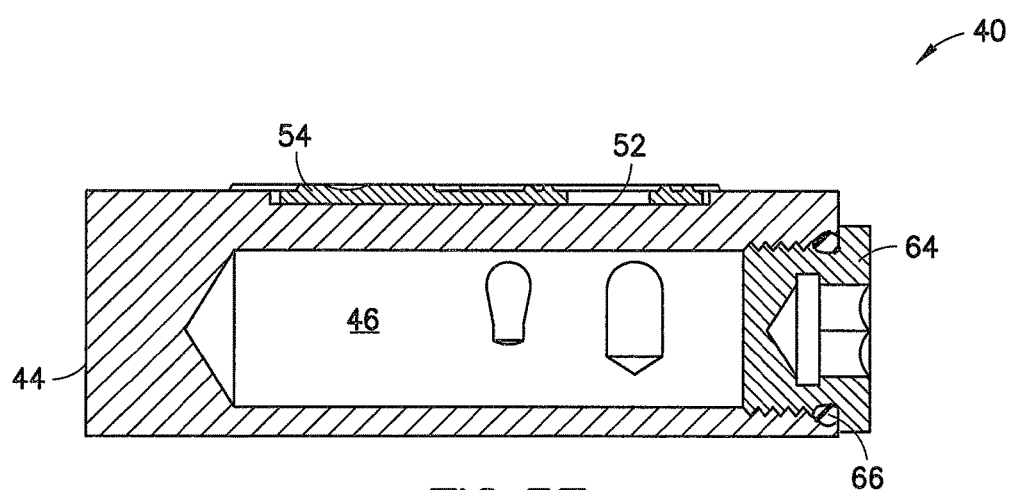
FIG. 3E is a cross-sectional view of the breather plate shown in FIG. 3C, taken along the line B1-B1.

With reference to FIGS. 3C-3E, and with continuing reference to FIGS. 3A-3B, internal volume 46 of breather plate 40 extends within the interior of body 44. Because internal volume 46 must be closely controlled, a breather plate plug 64 is provided on a side of body 44.

As best shown in FIG. 3B, breather plate 40 is provided with a stud 68 to prevent inappropriate interchange of an accelerated application valve with an otherwise unmodified ABDW-type emergency portion. As will be described in greater detail hereafter, several other modifications are necessary to an existing ABDW-type emergency portion before breather plate can be installed and the completed valve assembly be put into service. Drive stud 68 protrudes outward from first side 50 of body 44. Drive stud 68 is received within a corresponding opening provided on a rear side 14 of valve body 10. Such opening is created in an existing ABDW-type emergency portion after the appropriate internal modifications have been made to the emergency portion to assure the proper functioning of breather plate 40. In an event where an installation of a breather plate 40 is attempted on an unmodified ABDW-type emergency portion, drive stud 68 will prevent a proper mating between first side 50 of body 44 and planar face 26 of valve body 10. One of ordinary skill in the art will understand that the arrangement of the drive stud 68 and the corresponding opening may be reversed such that the drive stud 68 is provided on the valve body 10 and a corresponding opening on the breather plate 44.

Breather plate 40 replaces the accelerated application valve found on existing ABDW-type control valves and serves to route the air from the quick action chamber port (i.e., one of the plurality of air passages 28 provided on planar face 26) to internal volume 46. The air is then routed from internal volume 46 into the exhaust port (i.e. the other of the plurality of air passages 28 provided on planar face) on rear side of valve body 10 to which the accelerated application valve was previously mounted.

Figure 4A:
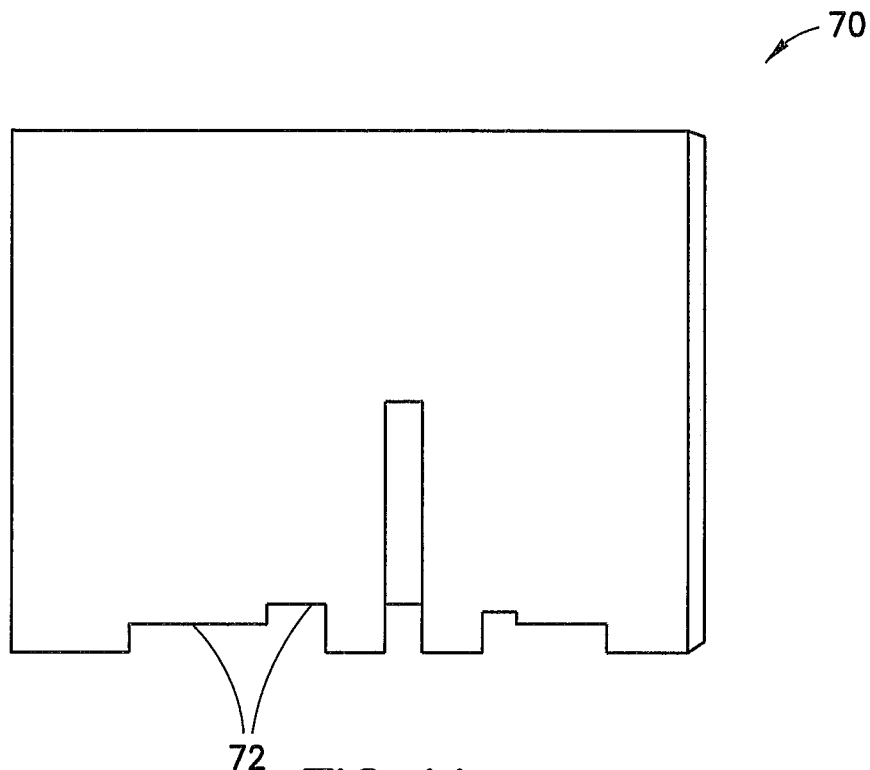
FIG. 4A is a right side view of a slide valve bushing for use with an ABDW control valve modified in accordance with one embodiment of the present disclosure.
Figure 4B:
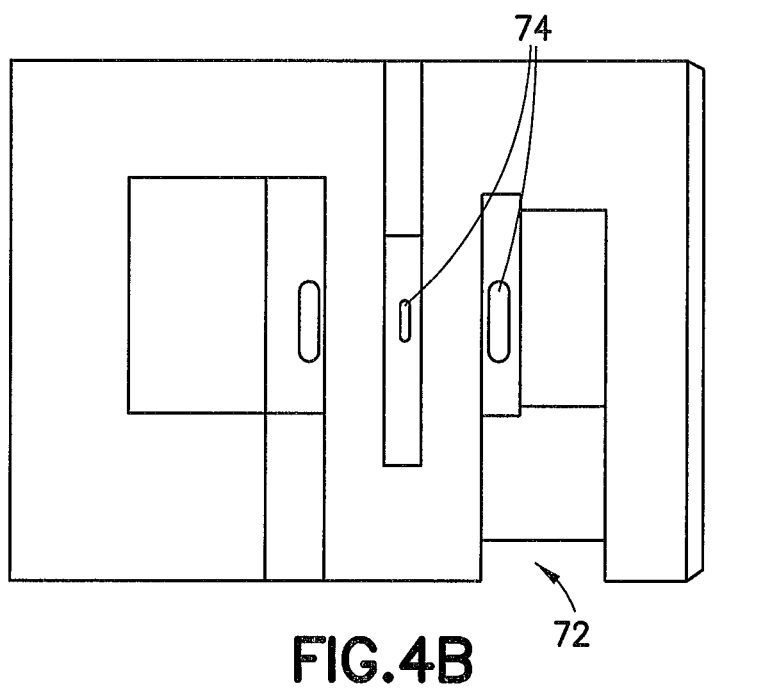
FIG. 4B is a bottom view of the slide valve bushing shown in FIG. 4A.
Figure 4C:
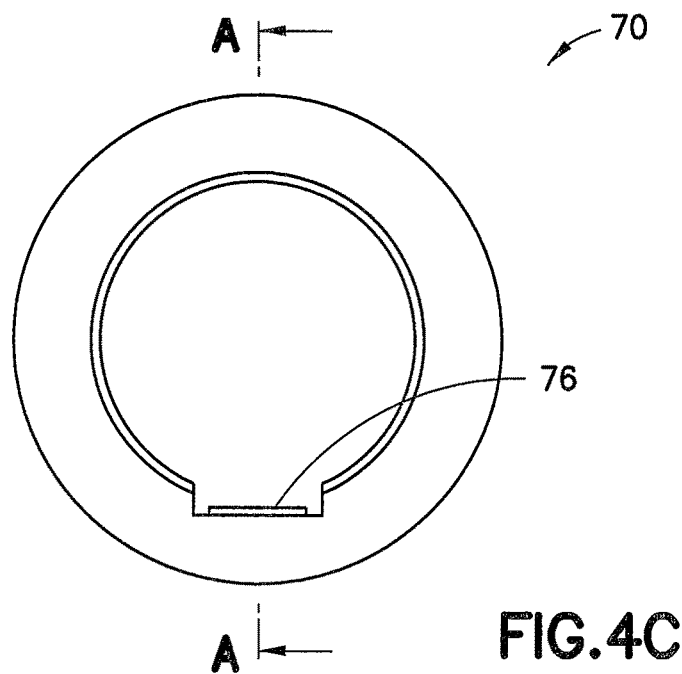
FIG. 4C is a front view of the slide valve bushing shown in FIG. 4A.
Figure 4D:
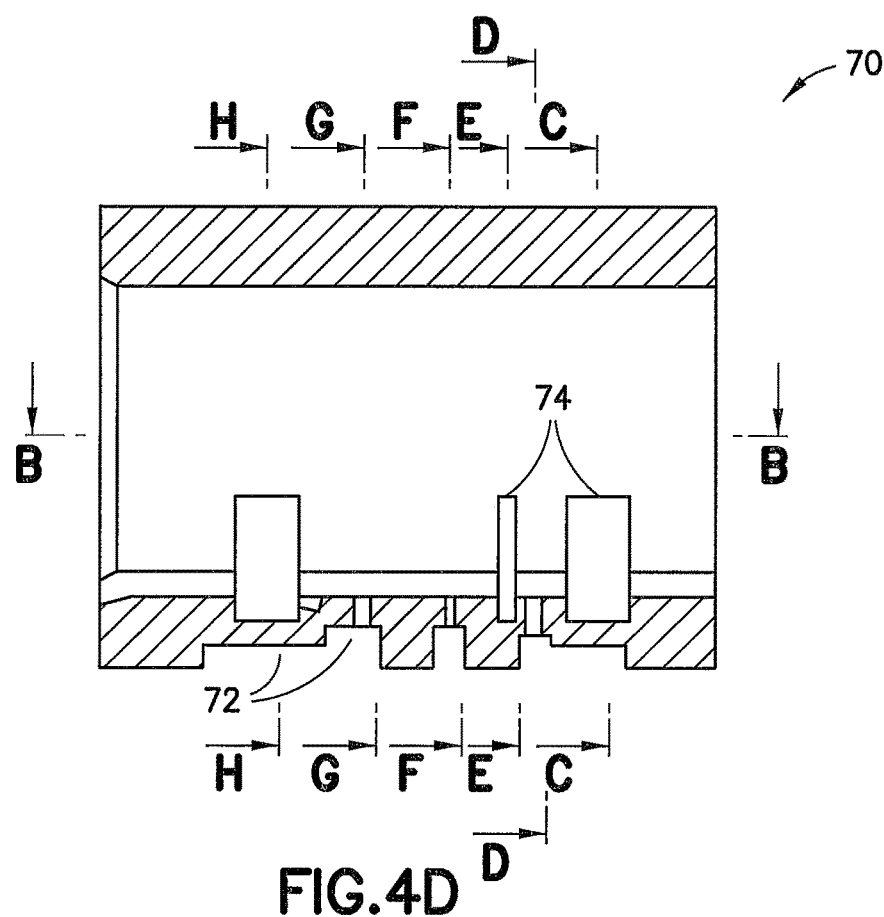
FIG. 4D is a side cross-sectional view of the slide valve bushing shown in FIG. 4C, taken along the line A1-A1.
Figure 4E:
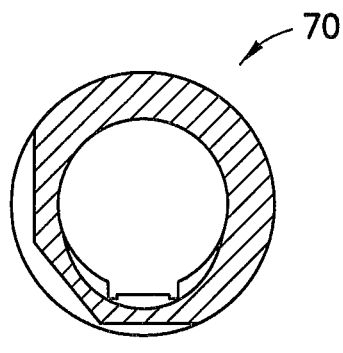
FIG. 4E is a front cross-sectional view of the slide valve bushing shown in FIG. 4D, taken along the line C-C.
Figure 4F:
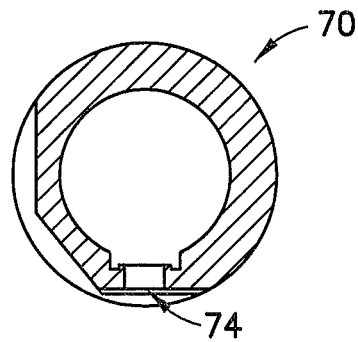
FIG. 4F is a front cross-sectional view of the slide valve bushing shown in FIG. 4D, taken along the line D-D.
Figure 4G:
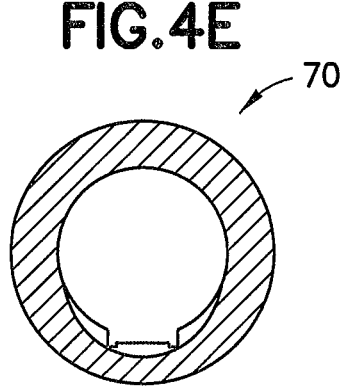
FIG. 4G is a front cross-sectional view of the slide valve bushing shown in FIG. 4D, taken along the line E-E.
Figure 4H:
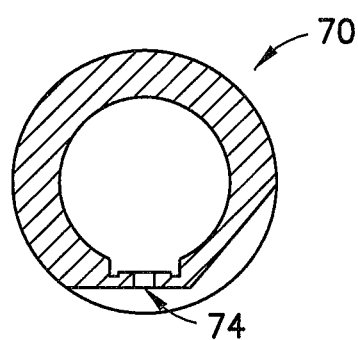
FIG. 4H is a front cross-sectional view of the slide valve bushing shown in FIG. 4D, taken along the line F-F.
Figure 4I:
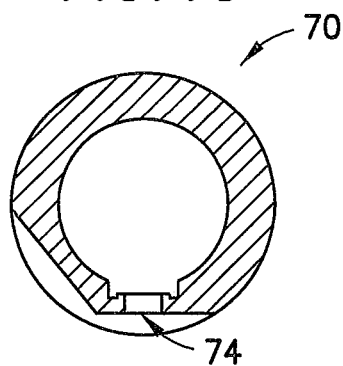
FIG. 4I is a front cross-sectional view of the slide valve bushing shown in FIG. 4D, taken along the line G-G.
Figure 4J:
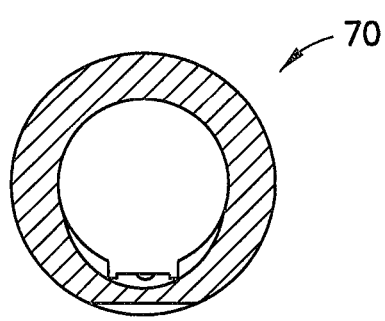
FIG. 4J is a front cross-sectional view of the slide valve bushing shown in FIG. 4D, taken along the line H-H.
Figure 5:
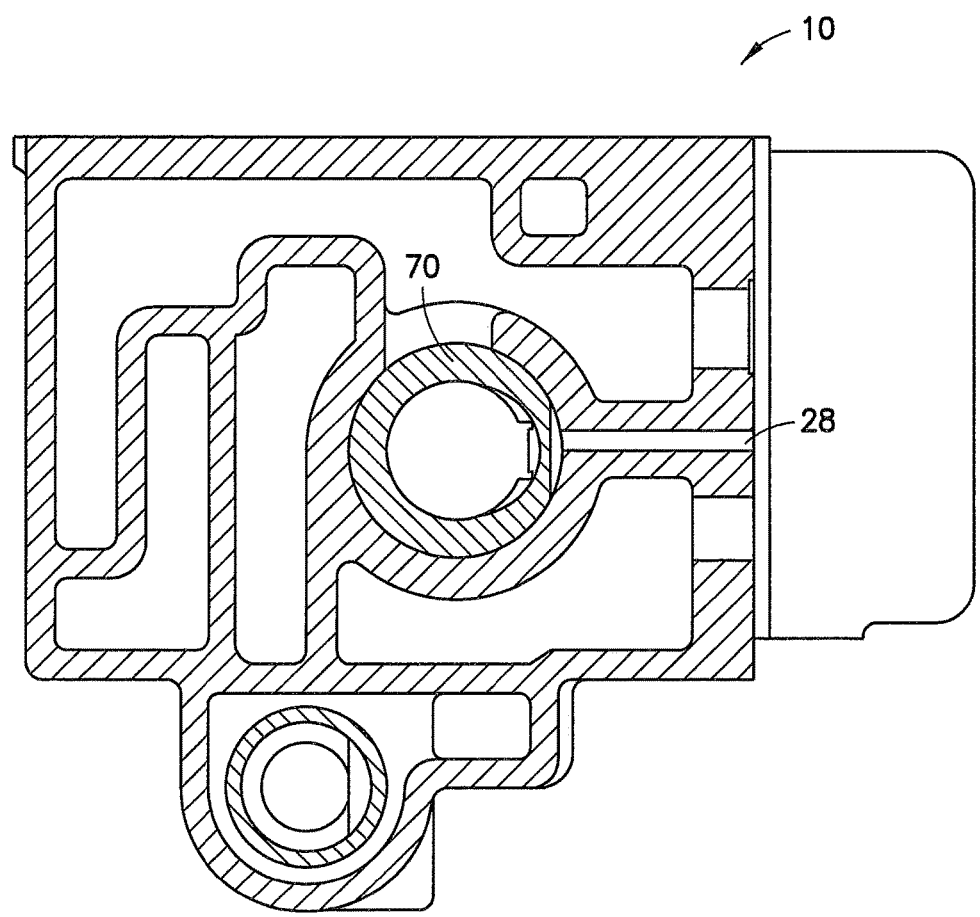
FIG. 5 is a top cross-sectional view of the ABDW control valve body shown in FIG. 1B.

Due to differences between internal components of an ABDW-type control valve and an ABDX-type control valve, additional modifications are made to an emergency portion of an existing ABDW-type valve body to convert it to an ABDX-type body. The function of the accelerated application valve from an ABDW-type control valve is carried out internally within the valve body 10 modified in accordance with one embodiment of the present disclosure. In order to eliminate the need for an accelerated application valve, the activity carried out by accelerated application valve is incorporated into the slide valve function. With reference to FIGS. 4A-4J, a slide valve bushing 70 replaces an existing ABDW-type bushing. Bushing 70 is installed in valve body 10 such that the slide valve seat faces the mounting face of the accelerated application valve. As best illustrated in FIG. 4D, bushing 70 includes a plurality of recessed passages 72 extending around at least a part of the external perimeter of bushing 70. The plurality of recessed passageways 72 are separated axially along a longitudinal extent of the bushing 70. Plurality of recessed passages 72 is adapted for providing fluid communication between various air passageways within valve body 10. Depending on the orientation of the slide valve, the plurality of recessed passageways 72 of bushing 70 route the air to the appropriate air passageway. Additionally, as further illustrated in FIG. 4D, bushing 70 includes a plurality of through passages 74 extending radially through at least one side of bushing 70. The plurality of through passages 74 are separated axially along a longitudinal extent of the bushing 70. Several slots 76 are provided along the longitudinal length of bushing 70 for providing fluid communication with the vent valve, the brake pipe, and the exhaust valve. FIG. 5 shows bushing 70 inserted into slide valve opening 34 on top side 20 of valve body 10.

Figure 6:
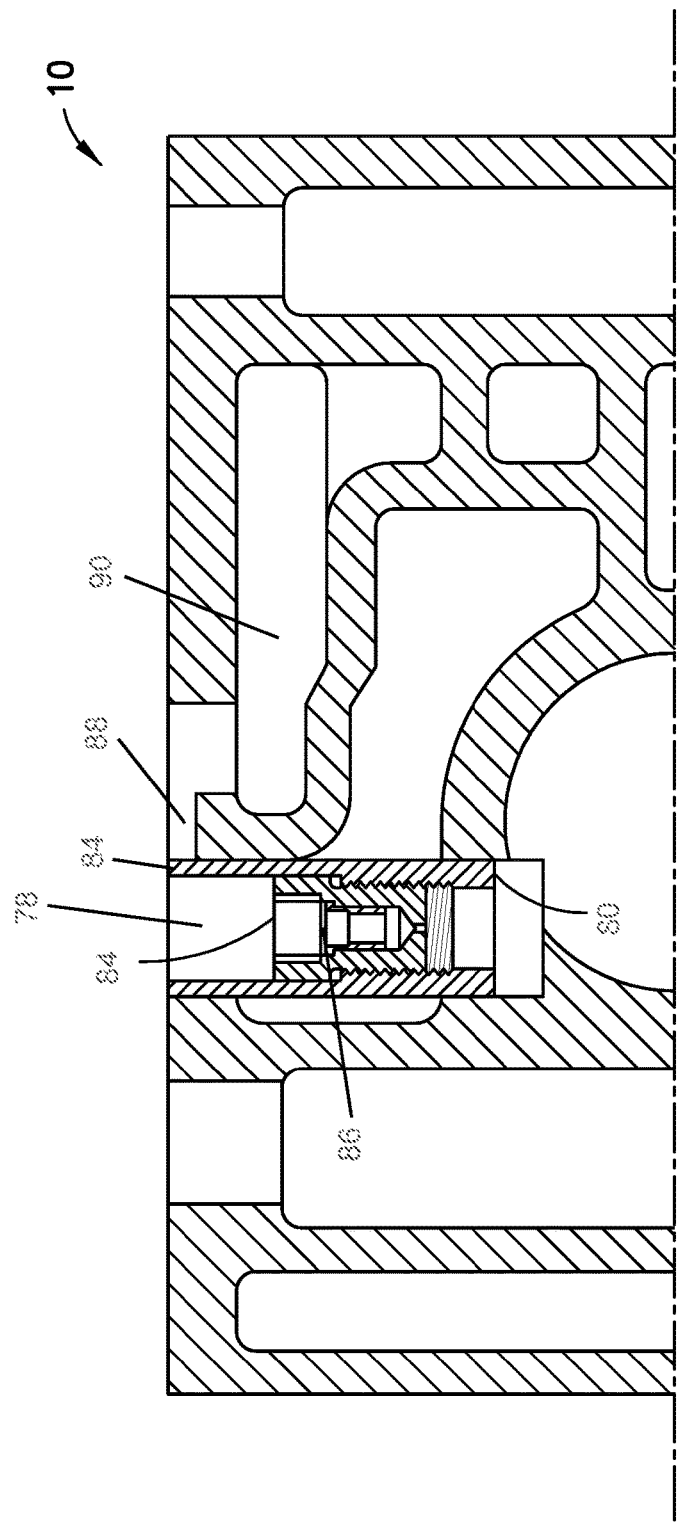
FIG. 6 is a top cross-sectional view of the ABDW control valve body shown in FIG. 1D.
Figure 7:
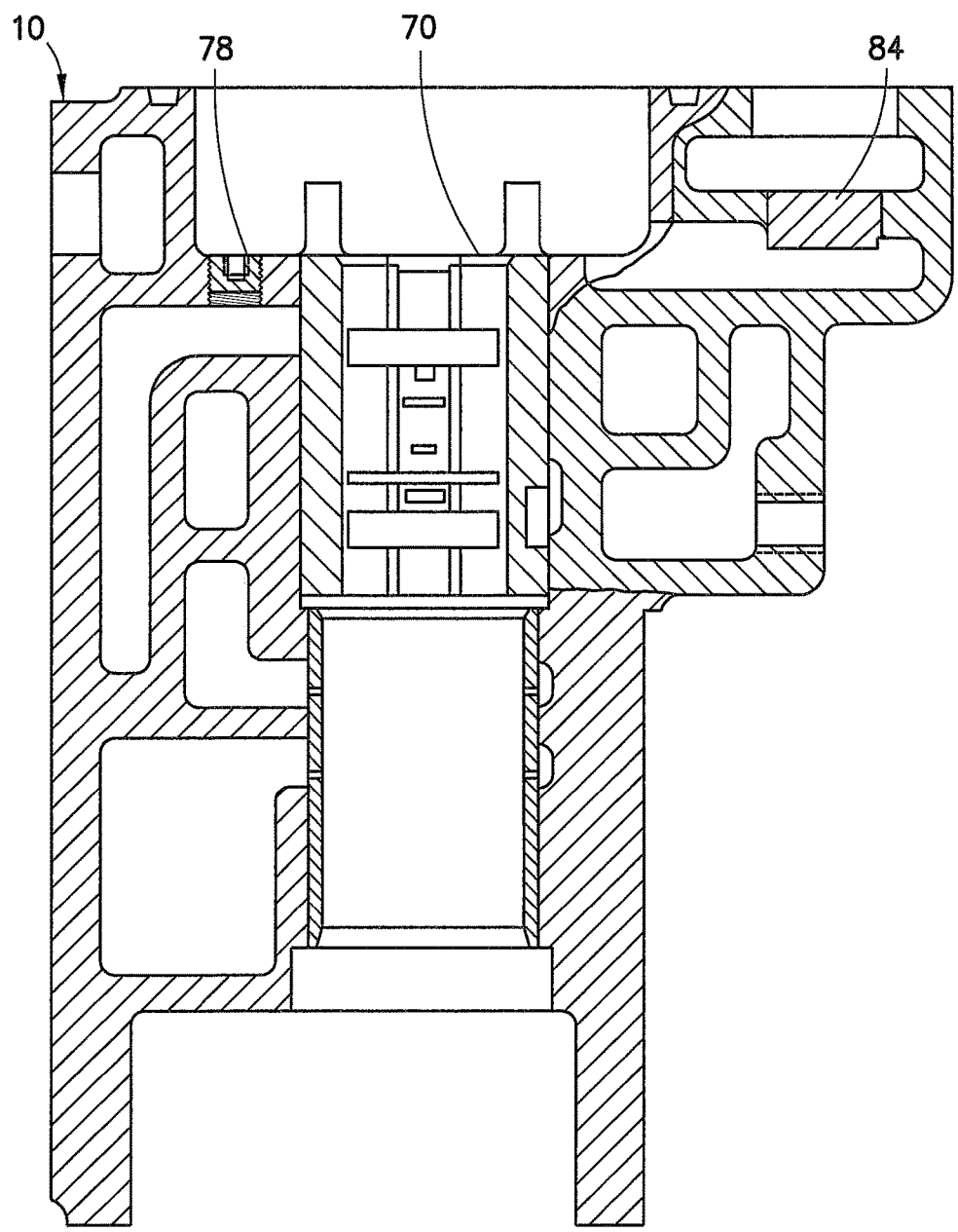
FIG. 7 is a partial cross-sectional view of the ABDW control valve body shown in FIG. 1E.

With reference to FIGS. 1D and 6, several modifications are made to an existing accelerated application valve (AAV) opening 78 on valve body 10. A tapered hole 80 is drilled in AAV opening 78 to accept AAV bushing 82. As shown in FIG. 1D, AAV bushing 82 is pressed into tapered hole 80. An AAV choke plug 84 is provided inside AAV bushing 82. AAV choke plug 84 has a central through passage having a reduced diameter compared to a diameter of AAV opening 78. A mesh filter 86 is provided on AAV choke plug 84 to filter impurities in the air passing through AAV choke plug 84. With continuing reference to FIG. 1D, a slot 88 is milled between AAV opening 78 and an air chamber 90. Slot 88 establishes a fluid communication between AAV opening 78 and air chamber 90. With reference to FIGS. 1E and 7, a plurality of plugs are provided to seal two of the plurality of air connections 32 provided on top side of valve body 10. The plugs may be threaded to the valve body 10, press fit to the valve body 10, or certain plugs may be threaded to the valve body 10 while other plugs are press fit to the valve body 10.

By replacing the accelerated application valve on an ABDW-type control valve, and by modifying the internal components of the ABDW-type control valve in accordance with the teachings described above, a conventional ABDW-type control valve is modified to have the function of a modern ABDX-type control valve. This eliminates the need to scrap an existing ABDW-type control valve body when updating the braking system of a railway vehicle to utilize the modern ABDX-type equipment. Performance characteristics of a new ABDX-type control valve are achieved by modifying an existing ABDW-type valve body and replacing the necessary components in accordance with the embodiments described herein.

While various embodiments of the apparatus and method for ABDW to ABDX control valve conversion were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

What is claimed is:

1. A system for converting a control valve having an external accelerated application valve to a control valve without an external accelerated application valve for use in a braking mechanism for a railway vehicle, the system comprising:
    a control valve body adapted for use with an external accelerated application valve in communication with an air supply system of the braking mechanism for the railway vehicle, the control valve body operative for controlling an application and release of brakes in response to changes in air pressure within the braking mechanism for the railway vehicle;
    a breather plate connected to an accelerated application valve interface on the control valve body, the breather plate comprising:
        a body having a first side opposite a second side and an internal stability volume between the first side and the second side for providing stability against undesired emergency applications due to fluctuations in brake pipe pressure;
            wherein the body defines a first opening of the internal stability volume and a second opening of the internal stability control volume;
            wherein the first opening and the second opening are in alignment with a first passageway and a second passageway on the accelerated application valve interface of the control valve body;
            wherein the first opening and the second opening of the internal stability volume provide the only fluid access to the internal stability volume from the control valve body; and
            wherein the first passageway and the second passageway of the control valve body are in continuous fluid communication with each other via the internal stability control volume regardless of the air pressure in the control valve;
    a slide valve bushing provided inside the control valve body for establishing fluid communication with at least the first passageway and the second passageway within the control valve body; and
    at least one control valve plug for sealing at least one air passageway within the control valve body.

2. The system according to claim 1, wherein the breather plate further comprises:
    a gasket surrounding the first opening and the second opening for sealing a fluid connection between the first passageway on the control valve body and the first opening on the breather plate and the second passageway on the control valve body and the second opening on the breather plate; and
    a plurality of through holes in alignment with a plurality of bolt holes provided on the accelerated application valve interface of the control valve body for connecting the breather plate to the control valve body.

3. The system according to claim 2, wherein the breather plate further comprises a breather plate plug connected to the body and in communication with the internal stability volume.

4. The system according to claim 3, wherein the breather plate plug includes an O-ring seal.

5. The system according to claim 2, wherein the breather plate further comprises a recessed gasket face on the first side of the breather plate, wherein the gasket is recessed within the recessed gasket face.

6. The system according to claim 2, wherein the breather plate further comprises a drive stud provided on the first side for engaging a corresponding opening provided on the control valve body.

7. The system according to claim 1, wherein the slide valve bushing further comprises a plurality of recessed passageways extending around at least a part of an external perimeter of the bushing, wherein the plurality of recessed passageways are separated axially along a longitudinal extent of the bushing.

8. The system according to claim 1, wherein the slide valve bushing further comprises a plurality of through passages extending radially through at least one side of the bushing, wherein the plurality of through passages are separated axially along a longitudinal extent of the bushing.

9. The system according to claim 1, wherein the at least one control valve plug is an accelerated application valve choke plug provided in an accelerated application valve opening on the valve body.

10. The system according to claim 9, wherein the accelerated application valve choke plug is inserted into an accelerated application valve bushing that is pressed inside the accelerated application valve opening.

11. The system according to claim 9, wherein the accelerated application valve choke plug comprises a mesh filter to filter impurities in air passing through the accelerated application valve choke.

12. The system according to claim 9, wherein a slot is provided between the accelerated application valve opening and an air chamber to establish a fluid connection between the accelerated application valve opening and the air chamber.

13. The system according to claim 1, wherein the breather plate further comprises a choke plug in one of the first opening or the second opening, the choke plug having a central passage extending through a longitudinal length thereof.

14. A breather plate for connecting and mounting to an accelerated application valve interface of a control valve body for converting a control valve having an external accelerated application valve to a control valve without an external accelerated application valve, the breather plate comprising:
    a body having a first side opposite a second side and an internal stability volume between the first side and the second side;
        wherein the body defines a first opening of the internal stability volume and a second opening of the internal stability control volume; and wherein the first opening and the second opening are in alignment with a first passageway and a second passageway on the accelerated application valve interface of the control valve body;

a gasket surrounding the first opening and the second opening for sealing the fluid connection between the first passageway on the control valve body and the first opening on the breather plate and the second passageway on the control valve body and the second opening on the breather plate; and a plurality of through holes in alignment with a plurality of bolt holes provided on the accelerated application valve interface of the control valve body for connecting the breather plate to the control valve body, wherein the first opening and the second opening of the internal stability volume provide the only fluid access to the internal stability volume from the control valve body; and wherein the first passageway and the second passageway of the control valve body are in continuous fluid communication with each other via the internal stability control volume regardless of the air pressure in the control valve.

15. The breather plate according to claim 14, further comprising a breather plate plug connected to the body and in communication with the internal stability volume.

16. The breather plate according to claim 15, wherein the breather plate plug includes an O-ring seal.

17. The breather plate according to claim 14, further comprising a recessed gasket face on the first side of the breather plate, wherein the gasket is recessed within the recessed gasket face.

18. The breather plate according to claim 14, further comprising a drive stud provided on the first side for engaging a corresponding opening provided on the control valve body.

19. The breather plate according to claim 14, further comprising a choke plug in one of the first opening or the second opening, the choke plug having a central passage extending through a longitudinal length thereof.

* * * * *